(12) United States Patent
Fujita et al.

(10) Patent No.: US 8,344,297 B2
(45) Date of Patent: Jan. 1, 2013

(54) CONTAINER FOR ELECTROMAGNETIC COOKERS

(75) Inventors: Hagino Fujita, Yokohama (JP);
Yoshitaka Yamamoto, Yokohama (JP);
Takayuki Aikawa, Yokohama (JP);
Takashi Miura, Tokyo (JP); Hideo Kurashima, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 750 days.

(21) Appl. No.: 12/306,874

(22) PCT Filed: Jun. 26, 2006

(86) PCT No.: PCT/JP2006/312757
§ 371 (c)(1),
(2), (4) Date: Aug. 11, 2009

(87) PCT Pub. No.: WO2008/001425
PCT Pub. Date: Jan. 3, 2008

(65) Prior Publication Data
US 2010/0059505 A1    Mar. 11, 2010

(51) Int. Cl.
*H05B 6/12*    (2006.01)
(52) U.S. Cl. .................. 219/620; 219/621; 219/626
(58) Field of Classification Search ........... 219/620–626
See application file for complete search history.

(56) References Cited

U.S. PATENT DOCUMENTS
4,467,162 A * 8/1984 Kondo et al. ................. 219/622

FOREIGN PATENT DOCUMENTS

| JP | 6274785 U | 5/1987 |
|---|---|---|
| JP | 08206004 | 8/1996 |
| JP | 2000287847 | 10/2000 |
| JP | 2000311773 | 11/2000 |
| JP | 2002177149 | 6/2002 |
| JP | 2003125928 | 5/2003 |
| JP | 2003325327 | 11/2003 |
| JP | 2006066258 | 3/2006 |
| JP | 2006185752 | 7/2006 |

* cited by examiner

*Primary Examiner* — H. Jey Tsai
(74) *Attorney, Agent, or Firm* — Browdy and Neimark, PLLC

(57) ABSTRACT

Problem to provide a container for an electromagnetic cooker which can be heated corresponding to impedance check frequency which differs depending on a manufacturer of an electromagnetic cooker or the like, can properly and easily set a heat generation characteristic, is excellent in marketability, configuration in use, disposability, handiness in cooking and the like, is suitable for retort foods, instant foods and the like, and exhibits high heating efficiency, means for resolution a container for an electromagnetic cooker includes a container body made of a non-conductive material and a conductive layer in a bottom portion of the container, wherein the ratio of resistance change (R−R0)/R0 of the conductive layer with respect to the impedance check frequency of a heating coil is set to 5.3 or more, and a ratio of inductance change (L−L0)/L0 of the conductive layer with respect to the impedance check frequency of the heating coil is set to −0.17 or less. Here, R indicates the high-frequency resistance (.OMEGA.) on a heating coil side with a load, R0 indicates the high-frequency resistance (.OMEGA.) on the heating coil side without a load, L indicates the inductance (.mu.H) on the heating coil side with a load, and L0 indicates the inductance (.mu.H) on the heating coil side without a load.

12 Claims, 6 Drawing Sheets

H: MH-B1 made by Hitachi Home & Life Solutions, Inc.
T: MR-A25LH made by TOSHIBA CONSUMER MARKETING CORPORATION
N: KZ-PH1 made by MATSUSHITA ELECTRIC IND Co., Ltd.
S: IC-SF10 made by SANYO Electric Co., Ltd.

CONTAINER FOR ELECTROMAGNETIC COOKERS

TECHNICAL FIELD

The present invention relates to a container for an electromagnetic cooker which can heat a content using Joule heat which is generated by an eddy current induced by an electromagnetic induction coil of the electromagnetic cooker.

BACKGROUND ART

Recently, an electromagnetic cooker which does not generate flames has been used in a household, a place that serves food and drink such as a restaurant or the like for cooking foods or heating cooked foods from a viewpoint of safety, cleanliness, convenience and economy. The electromagnetic cooker heats food in a container such that, when a container for an electromagnetic cooker made of steel or stainless steel is placed on the electromagnetic cooker, an eddy current is generated in a bottom portion of the container for an electromagnetic cooker due to lines of magnetic force from an electromagnetic coil, and this eddy current induces Joule heat which is used for heating the food in the container.

Further, by making use of such a principle, a large number of electromagnetic induction rice cooker (IH rice cookers) has been commercialized. As an instant-food-use container which enables heating thereof using an electromagnetic cooker by making use of such a principle, there has been proposed a container for an electromagnetic cooker such as an instant-food-use container which enables direct heating of a container which packs noodles such as Chinese noodles, buckwheat noodles or Japanese noodles, fried noodles therein by an electromagnetic cooker (patent document 1) or an aluminum-foil-made food container which enables heating of a container by an electromagnetic cooker (patent document 2).

Still further, there have been also proposed a container which is used in common for an electromagnetic cooker and an microwave oven and is manufactured by taking the separation of parts of the container by kinds, incineration of the container and recycling of a magnetic body which constitutes a heat generating body after use into consideration (patent document 3) and a container for an electromagnetic cooker which allows an aluminum foil to generate heat (patent document 4).

[Patent document 1] JP-A-2000-272676
[Patent document 2] JP-A-2002-51906
[Patent document 3] JP-A-2002-177149
[Patent document 4] JP-A-2003-325327

DISCLOSURE OF THE INVENTION

Task to be Solved by the Invention

However, in heating the instant-food-use containers by the conventional electromagnetic cooker described in the above-mentioned patent documents or the like, the instant-food-containers have following drawbacks.

The instant-food-container described in patent document 1 is constituted of an inner-layer container formed of a steel plate and an outer-layer container made of an insulation material. This patent document 1 further proposes following technical features. That is, a bottom surface of the inner-layer container is positioned within 5 mm from a bottom surface of the outer-layer container, a thickness of the steel plate is set to a value which falls within a range from 0.05 to 0.5 mm, and at least one or more processing selected from plating, chemical conversion treatment, lamination of a resin film and painting is applied to one or both surfaces of the steel plate from a viewpoint of imparting corrosion resistance to the instant-food-container. However, to take the fact that the instant-food-container is used for an instant food into consideration, such constitution pushes up a material cost and a forming cost and hence, the container is not economical. Further, with respect to impedance check frequency for determining whether or not an electromagnetic cooker can be heated, it is difficult to adjust a thickness or the configuration of a heat generating body, a distance from a heating coil or the like and hence, it is difficult to properly and easily set the heat generation properties.

Here, the impedance check frequency is frequency which is used for determining whether or not an electromagnetic cooker can be heated and differs from frequency at the time of actually heating the electromagnetic cooker. Further, a method for determining whether or not an electromagnetic cooker can be heated differs among manufacturers of electromagnetic cookers and hence, the impedance check frequency also differs depending on the manufacturers of electromagnetic cookers.

Further, with respect to the container described in patent document 2, there is proposed an aluminum-foil material-made food container which can be heated by an electromagnetic cooker, wherein the container has a flat bottom surface and is made of an aluminum foil material having a thickness of 12 μm to 96 μm. However, it is difficult for such a food container to adjust a thickness, the configuration or the like of the heat generating body corresponding to an oscillation conditions of an electromagnetic cooker (impedance check frequency intrinsic to a manufacturer) or the like and hence, it is difficult to properly and easily set heat generation properties.

Further, with respect to the container described in patent document 3, there has been proposed a container which mounts a plate material (heat generating body) formed of a magnetic body on a recessed bottom surface of a container made of a non-magnetic material, and the heat generating body is made of ferrite-based stainless steel or a material similar to the ferrite-based stainless steel. This kind of container pushes up a material cost and a forming cost when used for an instant food and hence, the container is not economical. Further, it is difficult to adjust a thickness or the configuration of a heat generating body, a distance from a heating coil or the like corresponding to oscillation conditions of an electromagnetic cooker (impedance check frequency intrinsic to a manufacturer) or the like and hence, it is difficult to properly and easily set the heat generation properties.

Further, with respect to the container described in patent document 4, there is proposed a technique in which an aluminum foil having a thickness of 0.10 to 100 μm is mounted on a bottom portion of a non-magnetic container body as a heat generating body, and the bottom portion of the container body has a thickness of 12.0 mm or less measured from a mounting surface of an electromagnetic cooker. Even when the electromagnetic cooker is manufactured under such conditions, there may be a case that a manufacturer of an electromagnetic cooker changes an oscillation conditions (impedance check frequency intrinsic to the manufacturer). In such a case, with mere setting of such conditions, it is impossible for an electromagnetic cooker to heat the container.

The present invention has been made to overcome the above-mentioned drawbacks, and it is an object of the present invention to provide a container for an electromagnetic cooker which is suitable for retort foods, instant foods or the like and exhibits high heating efficiency. The container can be manufactured at a low material cost and at a low forming cost as an instant-food-use container for heating food using an electromagnetic cooker. The container can be heated corresponding to the oscillation conditions of electromagnetic cookers which differ for respective manufactures (impedance check frequencies intrinsic to the manufacturers) or the like. The container also can properly and easily set a shape and heat generation properties of the container corresponding to a using purpose of the container.

Task to be Solved by the Invention

A container for an electromagnetic cooker described in claim 1 according to the present invention is characterized in that the container for the electromagnetic cooker includes a conductive layer at least in a bottom portion of the container made of a non-conductive material, wherein the ratio of resistance change (R−R0)/R0 of the conductive layer with respect to the impedance check frequency of a heating coil is set to 5.3 or more, and the ratio of inductance change (L−L0)/L0 of the conductive layer with respect to the impedance check frequency of the heating coil is set to −0.17 or less. Here, R indicates the high-frequency resistance ($\Omega$) on a heating coil side with a load, R0 indicates the high-frequency resistance ($\Omega$) on the heating coil side without a load, L indicates the inductance ($\mu$H) on the heating coil side with a load, and L0 indicates the inductance ($\mu$H) on the heating coil side without a load.

The container for the electromagnetic cooker described in claim 2 is, in the constitution described in claim 1, characterized in that the conductive layer is formed of a metal foil.

The container for the electromagnetic cooker described in claim 3 is, in the constitution described in claim 1, characterized in that the conductive layer is formed of a coating material containing metal powder.

The container for the electromagnetic cooker described in claim 4 is, in the constitution described in any one of claims 1 to 3, characterized in that the conductive layer is formed on an inner surface of the bottom portion of the container.

The container for the electromagnetic cooker described in claim 5 is, in the constitution described in claim 4, characterized in that the conductive layer is made of a laminate material constituted of a conductive material and a non-conductive material, and the conductive material is disposed on a bottom-portion side of the container.

The container for the electromagnetic cooker described in claim 6 is, in the constitution described in any one of claims 1 to 5, characterized in that the non-conductive material of the conductive layer is curved upwardly along a side wall of the container, and is adhered to a lower portion of an inner surface of the side wall of the container.

The container for the electromagnetic cooker described in claim 7 is, in the constitution described in claim 5 or 6, characterized in that a content liquid convection hole is formed in the non-conductive material of the laminate material.

The container for the electromagnetic cooker described in claim 8 is, in the constitution described in any one of claims 1 to 7, characterized in that the conductive layer is formed into a doughnut shape.

The container for the electromagnetic cooker described in claim 9 is, in the constitution described in any one of claims 1 to 8, characterized in that the conductive material of the conductive layer is formed into an uneven shape for increasing a surface area of the conductive material.

The container for the electromagnetic cooker described in claim 10 is, in the constitution described in any one of claims 7 to 9, characterized in that the conductive layer is configured to be vertically movable.

The container for the electromagnetic cooker described in claim 11 is, in the constitution described in any one of claims 1 to 10, characterized in that the conductive material is formed by lamination.

The container for the electromagnetic cooker described in claim 12 is, in the constitution described in claim 11, characterized in that the conductive material is formed by lamination while preventing end portions of the conductive material from overlapping with each other.

Advantage of the Invention

According to the container for an electromagnetic cooker of the present invention, the container can be heated corresponding to the oscillation conditions (impedance check frequency intrinsic to the manufacturer) of the electromagnetic cooker which differs for respective manufactures and, at the same time, the heat generation properties of the container can be properly and easily set thus enabling the acquisition of the electromagnetic cooker having high heating efficiency suitable for retort foods, instant foods and the like at a low cost.

Further, it is possible to provide the container for an electromagnetic cooker which is excellent in marketability, configuration in use, disposability, handiness in cooking and the like.

BEST MODE FOR CARRYING OUT THE INVENTION

A container for an electromagnetic cooker according to the present invention is characterized by including a conductive layer at least in a bottom portion of the container made of a non-conductive material, wherein the ratio of resistance change (R−R0)/R0 of the conductive layer with respect to the impedance check frequency of a heating coil is set to 5.3 or more, and the ratio of inductance change (L−L0)/L0 of the conductive layer with respect to the impedance check frequency of the heating coil is set to −0.17 or less. Here, R indicates the high-frequency resistance ($\Omega$) on a heating coil side with a load, R0 indicates the high-frequency resistance ($\Omega$) on the heating coil side without a load, L indicates the inductance ($\mu$H) on the heating coil side with a load, and L0 indicates the inductance ($\mu$H) on the heating coil side without a load.

In the present invention, the reason that the property of the conductive layer is specified using the ratio of resistance change and the ratio of inductance change is as follows. When the number of kinds of the electromagnetic cookers is only one, the property of the conductive layer can be acquired using a change quantity of the high-frequency resistance R ($\Omega$) and a change quantity of the inductance L ($\mu$H). However, a heating coil differs for every manufacturer of an electromagnetic cooker or for every type of electromagnetic cooker and hence, the high-frequency resistance R0 ($\Omega$) on the heating coil side without a load and the inductance L0 ($\mu$H) on the heating coil side without a load differ for every manufacturer or for every type of electromagnetic cooker. Accordingly, the property of the conductive layer is acquired by calculating the change ratio of the high-frequency resistance ($\Omega$) R and the change ratio of the inductance ($\mu$H) L.

The electromagnetic cooker utilizes the cancellation of magnetic fluxes by an AC current and the heat generation principle based on an eddy current which flows in a conductive body, and an oscillating frequency of the current is set to 10 to 90 kHz in general. On the other hand, as a material of a cooking container of the electromagnetic cooker, a ferromagnetic body which has a suitable thickness and can cancel AC magnetic fluxes is used. That is, a steel-made pan and the like made of iron having the proper electric resistance and a proper container strength is used as the cooking container.

Further, inventors of the present invention have extensively carried out experiments using electromagnetic cookers manufactured by various manufacturers and, as a result of the experiments, have found that with the use of the container in which a conductive material for constituting a conductive layer exhibits the ratio of resistance change $(R-R_0)/R_0$ of the conductive layer with respect to the oscillation condition of the electromagnetic cooker of each manufacturer (impedance check frequency intrinsic to the manufacturer) which is set to 5.3 or more, and the ratio of inductance change $(L-L_0)/L_0$ of the conductive layer with respect to the oscillation condition of the electromagnetic cooker of the respective manufacturers (impedance check frequency) which is set to −0.17 or less, that is, with the use of the container in which the conductive material which forms the conductive layer of the bottom portion of the container satisfies the above-mentioned change ratios, the cooking container can be heated corresponding to the electromagnetic cooker of each manufacturer. Further, although the smallest diameter of a pan of each manufacturer which can be heated is 120 mm, by adjusting properties of the conductive layer to satisfy the above-mentioned change ratios, it is possible to further decrease a value of the smallest diameter of the container.

First of all, the ratio of resistance change and the ratio of inductance change according to the present invention are explained. FIG. 1 is an explanatory view showing a method of measuring the high-frequency resistance and the inductance using an impedance analyzer.

As shown in FIG. 1, with respect to various kinds of conductive materials each of which is mounted on a bottom portion of the container as a conductive layer, each conductive material is placed on a top plate of the electromagnetic cooker manufactured by each manufacturer, and the high-frequency resistance R and the inductance L with respect to the impedance check frequency on a heating coil side are measured using the impedance analyzer. Next, the ratio of resistance change is defined as $(R-R_0)/R_0$, and the ratio of inductance change is defined as $(L-L_0)/L_0$. Here, $R_0$ indicates the high-frequency resistance (Ω) on the heating coil side without placing anything on the top plate, and $L_0$ indicates the inductance (μH) on the heating coil side without placing anything on the top plate.

FIG. 2 shows a result of confirmation whether or not the respective conductive materials can be heated at the impedance check frequency in a state that each one of various kinds of conductive materials is placed on the top plate of the electromagnetic cooker of each manufacturer in the above-mentioned manner. The result also includes a result of the ratio of resistance change and the ratio of inductance change in such a confirmation operation.

In FIG. 2, the conductive materials which can be heated are indicated by outlined symbols. As shown in FIG. 2, it is found that there exists a range within which the conductive materials can be heated regardless of the electromagnetic cookers manufactured by the respective manufacturers. It is also found that the conductive materials can be heated by the electromagnetic cookers manufactured by the respective manufactures provided that the above-mentioned ratio of resistance change $(R-R_0)/R_0$ is set to 5.3 or more, and the above-mentioned ratio of inductance change $(L-L_0)/L_0$ is set to −0.17 or less.

In general, there exists a tendency that when a thickness of the foil of the conductive layer is increased, the change ratio of the inductance L (μH) is decreased, the high-frequency resistance (Ω) R is decreased. Further, when the thickness of the foil of the conductive layer is increased, the ratio of inductance change $(L-L_0)/L_0$ is increased in the negative direction, and the ratio of resistance change $(R-R_0)/R_0$ is decreased.

Here, a thickness, a size, configuration, a material of the conductive layer may de determined within a range of the above-mentioned change ratios (the ratio of resistance change being set to 5.3 or more, and the ratio of inductance change being set to −0.17 or less).

Next, FIG. 3 shows the relationship between a material of the conductive layer and a required thickness of the conductive layer within the above-mentioned change ratios. FIG. 3 shows in an exemplified manner a result obtained by an experiment on the relationship between the bulk specific resistances of respective conductive materials and foil thicknesses of metal foils consisting of a silver foil, an aluminum foil and a tin foil necessary for heating. In the experiment, the conductive material is heated by an electromagnetic cooker (KZ-PH1) made by MATSUSHITA ELECTRIC INDUSTRY Co., Ltd. and a smallest diameter of the conductive material is set to φ85 mm.

It is understood from the result of the experiment that when the bulk specific resistance of the conductive material is small, it is sufficient for the conductive material to have a small thickness, while when the bulk specific resistance of the conductive material is large, it is necessary to increase the thickness of the conductive material. Here, the bulk specific resistance is resistivity intrinsic to a material and means volumetric resistivity.

As the non-conductive material which forms a container body of the container for an electromagnetic cooker of the present invention, it is possible to use a multi-layered material which forms an intermediate layer thereof using a gas-barrier resin such as an olefin resin selected from a group consisting of polyurethane, polyethylene, polypropylene and the like, a polyester resin, a polyamide resin, or ethylene-vinyl alcohol copolymer.

Further, the container body may be formed using paper or a multi-layered material consisting of paper material and the above-mentioned resin.

Still further, the container may be configured in a cup shape, a tray shape, a standing pouch shape or the like. However, the configuration of the container is not limited to such shapes.

The conductive layer is preferably formed using a metal foil from a view point that the ratio of inductance change can be satisfied, and it is also preferable to laminate the metal foils having a thickness as small as possible from a viewpoint that the ratio of resistance change can be satisfied. Such a metal foil is not particularly limited. The conductive layer may be made of either one of a magnetic material and a non-magnetic material. As the material of the conductive layer, a silver foil, a gold foil, a copper foil, a platinum foil, an aluminum foil, a zinc foil, a tin foil, a nickel foil, an iron foil, a stainless steel foil and the like may be named. The aluminum foil is more preferable from a viewpoint of a manufacturing cost. Here, a laminate material which is formed by laminating the metal foil of the conductive material to a non-conductive material such as a sheet of paper or a resin sheet may be mounted at least on an inner surface of a bottom portion of the container.

The laminate material may be mounted on the bottom portion or a side wall of the container.

With respect to the conductive material, when the gold foil, the silver foil or the platinum foil is used as the metal foil, such a foil is hardly dissolved into food and hence, it is not always necessary to use the foil in a form of a laminate material.

Further, from a viewpoint of increasing the high-frequency resistance, it is preferable to form the conductive layer by applying a coating material containing metal powder made of a conductive material such as a conductive paint to a bottom portion of the container, preferably to an inner surface of the bottom portion of the container. Here, the metal foil is mounted on the bottom of the container and, thereafter, the coating material made of the above-mentioned conductive material is applied to the non-conductive material such as a sheet of paper or a resin sheet by coating thus forming the conductive layer on the bottom portion of the container.

In the container for an electromagnetic cooker of the present invention, although the conductive layer may be formed on an outer surface of the bottom portion of the container, from a viewpoint of preventing breaking of the container at the time of generation of heat or the like, it is preferable to form the conductive layer on the inner surface of the bottom portion of the container. Further, from a viewpoint of enhancing a heat generation effect acquired by an eddy current which flows in the conductive material, it is preferable to form the conductive layer using a laminate material made of a conductive material and a non-conductive material and to form the conductive material on a container bottom portion side.

Further, in the container for the electromagnetic cooker of the present invention, an end portion of the non-conductive material of the conductive layer formed of the laminate material may be curved upwardly along a sidewall of the container, and the end portion is adhered to a lower portion of an inner surface of the side wall of the container using an adhesive agent or by heat sealing or the like thus facilitating mounting of the conductive layer on the bottom portion of the container.

Further, by forming content liquid convection holes in the above-mentioned non-conductive material, the convection of the liquid can be effectively generated in the container at the time of heating the container by the electromagnetic cooker. Further, by forming the above-mentioned conductive layer in a donut shape, the heating efficiency by the electromagnetic cooker can be enhanced. Still further, when the conductive layer is abnormally heated, the conductive layer is broken so that heating can be stopped.

Further, by increasing a surface area of the conductive material of the conductive layer by forming unevenness on a surface of the conductive material, the heating efficiency can be further enhanced.

Further, in the container for an electromagnetic cooker of the present invention, by allowing the conductive layer to move upwardly and downwardly, the conductive material of the conductive layer can be moved upwardly or downwardly from a heating coil of an electromagnetic cooker within a fixed range and hence, it is possible to prevent the container from being damaged due to overheating of the conductive layer thus maintaining the temperature of a content within a fixed range.

Further, when a thickness of the conductive material is sufficiently small compared to a penetration depth of a high-frequency current, the conductive material may have the multi-layered structure so that the high-frequency resistance and inductance can be adjusted within a proper range by adjusting the number of laminated layers whereby the heating efficiency can be enhanced and, at the same time, a size of the container can be set to a small size thus providing a compact container. In this case, from a viewpoint of preventing breaking of the container by overheating, it is preferable to laminate layers of the conductive material such that end portions of the laminated layers do not overlap with each other.

The container for an electromagnetic cooker according to the present invention is also applicable to an electromagnetic rice cooker (IH rice cooker). Further, by applying the conductive layer to the container by coating such that a peripheral end portion of the conductive layer is not exposed, it is possible to prevent a spark even when the container is heated using by a microwave oven and hence, the container for an electromagnetic cooker can be also used as a heating container for a microwave oven.

The container for an electromagnetic cooker of the present invention is explained in detail hereinafter in conjunction with attached drawings.

FIG. 4 and FIG. 5 show an embodiment 1 of the container for an electromagnetic cooker of the present invention, wherein FIG. 4 is a plan view of the container and FIG. 5 is a cross-sectional view taken along a line A-A in FIG. 4. Polypropylene (non-conductive material) is used as a material of the container 1. The container 1 has a side wall portion 2 and a bottom portion 3. A conductive layer 4 which is formed of a laminate material consisting of a conductive material 5 formed of a plurality of aluminum foils and a non-conductive material 6 made of polypropylene is formed on an inner surface of the bottom portion 3. To position the above-mentioned conductive material 5 on a bottom portion 3 side of the container 1, an end portion of the non-conductive material 6 of the conductive layer 4 is curved upwardly along the side wall 2 of the container 1, and the above-mentioned conductive layer 4 is mounted on a lower portion of the inner surface of the above-mentioned side wall 2 by heat sealing.

Then, to effectively generate the convection of a liquid in the container 1 at the time of heating by an electromagnetic cooker, content liquid convection holes 7 are formed in the non-conductive material 6 of the above-mentioned laminate material which constitutes the conductive layer 4.

Further, the above-mentioned conductive layer 4 is formed in a donut shape by forming a hole 8 in center portions of the conductive material 5 and the non-conductive material 6 respectively and by removing such center portions. Due to such constitution, the heating efficiency by the electromagnetic cooker can be enhanced and, at the same time, even when the conductive layer 4 is abnormally heated, it is possible to prevent overheating caused by breaking of the conductive layer 4.

FIG. 6 to FIG. 9 show an embodiment 2 of the container for the electromagnetic cooker of the present invention, wherein FIG. 6 is a plan view of the container, and FIG. 7 is a cross-sectional view taken along a line B-B in FIG. 6. FIG. 8 and FIG. 9 show an inner cup (conductive material 5) which is mounted on an inner side of the container of the embodiment 2, wherein FIG. 8 is a plan view of the inner cup and FIG. 9 is a front view of the inner cup.

As shown in FIG. 6 and FIG. 7, an inner cup fixing member is formed on the container 1 such that an upper end portion of the inner cup fixing member 9 is heat-sealed to an upper portion of the side wall 2 and fixing portions which project inwardly are formed on a side wall of the inner cup fixing member 9 at equal intervals. With the use of this fixing member 9, it is possible to easily mount and fix an inner cup (conductive material 5) to the container 1. That is, it is possible to house the inner cup in the container 1 by arranging a conductive layer 4 close to a bottom portion 3 of the container 1 and by inserting the fixing portions of the fixing member 9 into flared recessed portions 5*b* (see FIG. 9) formed on a side wall 5*a* of a conductive layer 4.

Here, with respect to the inner cup used in the container of the embodiment 2, as shown in FIG. 8 and FIG. 9, the conductive layer 4 is curved upwardly such that the conductive material forming a lower surface of the conductive material 5 formed of a plurality of aluminum foils extends along the side wall 2 of the container 1, and vertically-elongated recessed portions 5*b* are formed on the side wall 5*a* of the container 1 thus forming unevenness (wrinkles) at equal intervals thus increasing a surface area of the side wall 5*a* whereby heating efficiency can be further enhanced.

FIG. 10 to FIG. 12 show an embodiment 3 of the container for an electromagnetic cooker according to the present invention, wherein FIG. 10 is a plan view of the container, and FIG. 11 is a cross-sectional view taken along a line C-C in FIG. 10. The container according to the embodiment 3 is formed such that a conductive layer 4 is formed of a laminate sheet material consisting of a donut-shaped conductive material 5 formed of an aluminum foil and a non-conductive material 6 made of polypropylene which forms content liquid convection holes 7 therein in a grating shape. An annular leg portion 10 made of polypropylene is suitably adhered to a lower portion of a periphery of the conductive layer 4 and is placed on an inner surface of a bottom portion 3 of a container 1 such that the conductive material 5 is arranged on a container bottom 3 side.

Due to such constitution, it is possible to easily steam the content in the container.

Further, FIG. 12 shows a container for an electromagnetic cooker in which the conductive layer 4 is made lightweighted by removing the above-mentioned leg portion 10. That is, in FIG. 12, the conductive layer 4 is shown in a state that the conductive layer floats on a content liquid. By allowing the conductive layer 4 to be movable upwardly and downwardly, the conductive material 5 of the above-mentioned conductive layer 4 can be moved upwardly and downwardly within a fixed range from a heating coil of an electromagnetic cooker so that it is possible to prevent the container from being damaged by overheating of the conductive layer and it is also possible to maintain a temperature of the content within a fixed range.

Here, according to the container for an electromagnetic cooker of the present invention explained above, the conductive material 5 of the conductive layer 4 has the laminated structure and hence, it is possible to adjust the high-frequency resistance and inductance such that these properties fall within proper ranges whereby the heating efficiency is enhanced and, at the same time, it is possible to make the container 1 small-sized. Accordingly, it is possible to provide the container 1 of a size smaller than the smallest diameters of pans which the cookers manufactured by the respective manufacturers can heat.

In this case, from a viewpoint of preventing breaking of the container by overheating, it is desirable to laminate the foils such that end portions of the foils do not overlap with each other.

Further, when a thickness of the conductive material is sufficiently smaller than a penetration depth, the conductive material may have the multi-layered structure and the high-frequency resistance and inductance may be adjusted to values which fall within proper ranges by changing the number of lamination layers.

Experiment

1. Measurement of high-frequency resistance ($\Omega$) and inductance ($\mu H$) at impedance check frequency of electromagnetic cooker and impedance check frequency of container for electromagnetic cooker, and calculation of ratio of resistance change and ratio of inductance change.

As shown in FIG. 1, using an LF•Impedance analyzer (4192A) made by Yokogawa Hewlett Packard Co., high-frequency resistance R ($\Omega$) and inductance L ($\mu H$) at the impedance check frequency of the conductive layer of the manufactured container for an electromagnetic cooker are measured.

R0 indicates the high-frequency resistance ($\Omega$) on the heating coil side without placing anything on the top plate, and L0 indicates the inductance ($\mu H$) on the heating coil side without placing anything on the top plate. The ratio of resistance change is calculated as $(R-R0)/R0$, and the ratio of inductance change is calculated as $(L-L0)/L0$.

2. Evaluation 400 cc of water is filled in the manufactured container for an electromagnetic cooker, and the container is heated by the electromagnetic cookers and the IH rice cookers manufactured by the respective manufacturers, and it is confirmed whether or not the container can be heated by the electromagnetic cookers and the IH rice cookers manufactured by all manufacturers. With respect to the electromagnetic cookers with which the container can be heated, the temperature elevation time from 30° C. to 80° C. is measured.

(Experiment 1)

A container body having an inner diameter of 175 mm, a height of 120 mm and an inner volume of 1200 cc is formed using a polypropylene sheet having a thickness of 2.5 mm.

On the other hand, a conductive material is formed by laminating two aluminum foils having a thickness of 7 $\mu m$ and an outer diameter of 150 mm, and a polypropylene film is laminated to both surfaces of the conductive material thus forming a conductive layer.

Then, an end portion of the polypropylene film is heat-sealed to a lower portion of an inner surface of a side wall of the container body such that the aluminum foils which constitute the conductive material are positioned on a bottom portion side of the container body in the container body thus forming a container for an electromagnetic cooker.

The container is heated using four kinds of electromagnetic cookers, that is, KZ-PH1 made by MATSUSHITA ELECTRIC IND CO LTD, MH-B1 made by Hitachi Home & Life Solutions, Inc., IC-SF10 made by SANYO Electric Co., Ltd. and MR-A25LH made by TOSHIBA CONSUMER MARKETING CORPORATION, and it is evaluated whether or not the container can be heated by the respective electromagnetic cookers.

(Experiment 2)

Heating of a container for an electromagnetic cooker and evaluation on whether or not the container can be heated by electromagnetic cookers are performed in the same manner as the experiment 1 except for that a hole having a diameter of 60 mm is formed in a center portion of the conductive layer of the experiment 1 thus forming the conductive layer into a donut shape.

(Experiment 3)

A container body having an inner diameter of 110 mm, a height of 50 mm and an inner volume of 600 cc is formed using a polypropylene sheet having a thickness of 0.5 mm.

On the other hand, a conductive material is formed by laminating three aluminum foils having a thickness of 7 $\mu m$ and an outer diameters of 110 mm, 105 mm and 100 mm, a polypropylene film is laminated to both surfaces of the conductive material, and a hole having a diameter of 60 mm is formed in a center portion of the polypropylene film thus forming a conductive layer.

Then, an end portion of the polypropylene film is heat-sealed to a lower portion of an inner surface of a side wall of the container body such that the conductive material of the conductive layer is positioned on a bottom portion side of the container body in the container body thus forming a container for an electromagnetic cooker. Thereafter, heating of a container for an electromagnetic cooker and evaluation of whether or not the container can be heated by electromagnetic cookers are performed.

(Experiment 4)

In this experiment 4, it is confirmed whether or not the container for an electromagnetic cooker of the experiment 1 can cook rice using IH rice cookers. As the IH rice cookers, seven kinds of rice cookers, that is, SR-XG10 made by MATSUSHITA ELECTRIC IND CO LTD, ECJ-FZ10 made by SANYO Electric Co., Ltd., RC-10KW made by TOSHIBA CONSUMER MARKETING CORPORATION, RZ-CG10J made by Hitachi Home & Life Solutions, Inc., JKA-G100TG made by TIGER VACUUM BOTTLE CO LTD, NJ-GZ10-S made by MITSUBISHI ELECTRIC CORP and NHC-C10 made by ZOJIRUSHI CORP are used. Rice is cooked using rice cooking functions of the respective rice cookers, and it is confirmed whether or not rice can be cooked using the respective rice cookers. The result shows that all rice cookers can cook rice.

With respect to the impedance check frequencies (kHz) of the above-mentioned rice cookers, the impedance check frequency of SR-XG10 made by MATSUSHITA ELECTRIC IND CO LTD, the frequency of RC-10 KW made by TOSHIBA CONSUMER MARKETING CORPORATION and RZ-CG10J made by Hitachi Home & Life Solutions, Inc. are approximately 35 kHz, the frequency of ECJ-FZ10 made by SANYO Electric Co., Ltd. is approximately 30 kHz, the frequency of NJ-GZ10-S made by MITSUBISHI ELECTRIC CORP and the frequency of NHC-C10 made by ZOJIRUSHI CORP are approximately 40 kHz, and no oscillation is recognized with respect to JKA-G100TG made by TIGER VACUUM BOTTLE CO LTD.

Comparison Example 1

Heating of a container for an electromagnetic cooker and evaluation of whether or not the container can be heated by electromagnetic cookers are performed in the same manner as the experiment 1 except for that the conductive material of the comparison example 1 is formed of one sheet of aluminum foil having an outer diameter of φ145 mm.

Comparison Example 2

Heating of a container for an electromagnetic cooker and evaluation of whether or not the container can be heated by electromagnetic cookers are performed in the same manner as the experiment 1 except for that the conductive material of the comparison example 2 is formed of one sheet of aluminum foil having an outer diameter of φ150 mm.

From a result of the evaluation of the above-mentioned experiments, it is understood that the container for an electromagnetic cooker of the present invention can be heated corresponding to the electromagnetic cooker of the respective manufacturers provided that the ratio of resistance change and the ratio of inductance change fall within allowable ranges. Further, with respect to the electromagnetic cookers manufactured by the respective manufacturers, the smallest diameter of the pan which can be heated is 120 mm. However, by adjusting sizes of the conductive later such that the conductive layer satisfies the above-mentioned change ratios as in the case of the experiment 3, the smallest diameter of the container can be further decreased.

The high-frequency resistances (Ω), the inductances (μH), the ratios of resistance change and the ratio of inductance change at the impedance check frequencies of the electromagnetic cookers manufactured by the respective manufacturers used in the experiments and at the impedance check frequencies of the containers for electromagnetic cookers of the respective experiments and the comparison examples and are shown in Table 1.

Further, configurations of the conductive materials for forming the conductive layers of the containers for electromagnetic cookers in the respective experiments and the comparison examples, and the evaluation result of the respective experiments are shown in Table 2.

TABLE 1

| | Impedance check frequency (kHz) | | | | | | | |
|---|---|---|---|---|---|---|---|---|
| | MATSUSHITA ELECTRIC approximately 40 | SANYO Electric approximately 30 | TOSHIBA CM approximately 30 | Hitachi HHL approximately 40 | MATSUSHITA ELECTRIC | SANYO Electric | TOSHIBA CM | Hitachi HL |
| | high-frequency resistance (Ω) at impedance check frequency | | | | inductance (μH) at impedance check frequency | | | |
| Experiment 1 | 2.39 | 1.97 | 1.24 | 1.80 | −18.22 | −15.79 | −9.42 | −13.93 |
| Experiment 2 | 2.43 | 1.98 | 1.27 | 1.83 | −17.94 | −15.11 | −9.30 | −13.67 |
| Experiment 3 | 1.96 | 1.65 | 0.96 | 1.52 | −13.70 | −12.45 | −7.07 | −10.21 |
| Comparison example 1 | 2.76 | 1.94 | 1.18 | 2.11 | −10.50 | −7.65 | −4.49 | −8.05 |
| Comparison example 2 | 2.87 | 2.01 | 1.24 | 2.18 | −11.30 | −8.21 | −4.86 | −8.62 |

| | | MATSUSHITA ELECTRIC | SANYO Electric | TOSHIBA CM | Hitachi HL | MATSUSHITA ELECTRIC | SANYO Electric | TOSHIBA CM | Hitachi HL |
|---|---|---|---|---|---|---|---|---|---|
| | | ratio of resistance change at impedance check frequency [(R−R0)/R0] | | | | ratio of inductance change at impedance check frequency [(L−L0)/L0] | | | |
| | Experiment 1 | 11.38 | 10.97 | 8.70 | 10.88 | −0.30 | −0.26 | −0.23 | −0.29 |
| | Experiment 2 | 11.57 | 10.98 | 8.92 | 11.11 | −0.30 | −0.25 | −0.22 | −0.28 |

TABLE 1-continued

| | | | | | | | | |
|---|---|---|---|---|---|---|---|---|
| Experiment 3 | 9.33 | 9.14 | 6.76 | 9.21 | −0.23 | −0.20 | −0.17 | −0.21 |
| Comparison example 1 | 13.14 | 10.76 | 8.32 | 12.78 | −0.17 | −0.13 | −0.11 | −0.16 |
| Comparison example 2 | 13.67 | 11.15 | 8.73 | 13.22 | −0.19 | −0.13 | −0.12 | −0.18 |

Note:
MATSUSHITA ELECTRIC: KZ-PH1 made by MATSUSHITA ELECTRIC IND CO LTD
SANYO Electric: IC-SF10 made by SANYO Electric Co., Ltd.
TOSHIBA CM: MR-A25LH made by TOSHIBA CONSUMER MARKETING CORPORATION
Hitachi HR: MH-B1 made by Hitachi Home & Life Solutions, Inc.

TABLE 2

| | Configuration of conductive material | | Thickness of conductive material (μm) | Outer diameter of conductive material (mm) | Heating time | | | |
|---|---|---|---|---|---|---|---|---|
| | Configuration | Conductive material of conductive layer | | | MATSUSHITA ELECTRIC | SANYO Electric | TOSHIBA CM | Hitachi HL |
| Experiment 1 | Laminated | aluminum foil | 7 × 2 | φ150 | 2'36" | 2'57" | 2'23" | 2'27" |
| Experiment 2 | Laminated doughnut shape | aluminum foil | 7 × 2 | φ150 (inner diameter 60) | 2'40" | 2'44" | 2'29" | 2'39" |
| Experiment 3 | Laminated doughnut shape | aluminum foil | 7 × 3 | φ110 (inner diameter 60) φ105 (inner diameter 60) φ100 (inner diameter 60) | 3'16" | 3'32" | 3'00" | 2'47" |
| Comparison example 1 | Disk shape | aluminum foil | 7 | φ145 | 4'43" | Heating impossible | Heating impossible | Heating impossible |
| Comparison example 2 | Disk shape | aluminum foil | 7 | φ150 | 4'39" | Heating impossible | Heating impossible | 3'48" |

Note:
MATSUSHITA ELECTRIC: KZ-PH1 made by MATSUSHITA ELECTRIC IND CO LTD
SANYO Electric: IC-SF10 made by SANYO Electric Co., Ltd.
TOSHIBA CM: MR-A25LH made by TOSHIBA CONSUMER MARKETING CORPORATION
Hitachi HL: MH-B1 made by Hitachi Home & Life Solutions, Inc.

DESCRIPTION OF THE REFERENCE NUMERALS AND SIGNS

Figure 1:
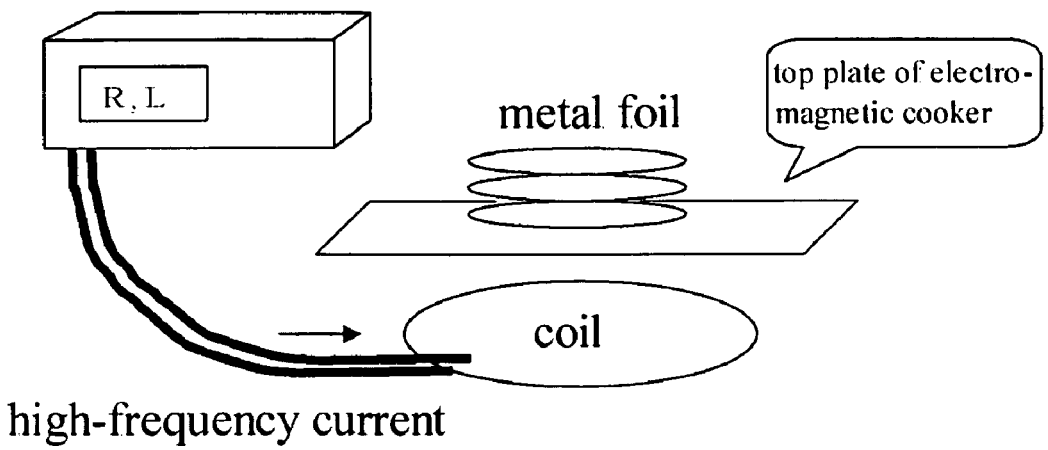
FIG. 1 An explanatory view showing a method of measuring high-frequency resistance and inductance using an impedance analyzer.
Figure 2:
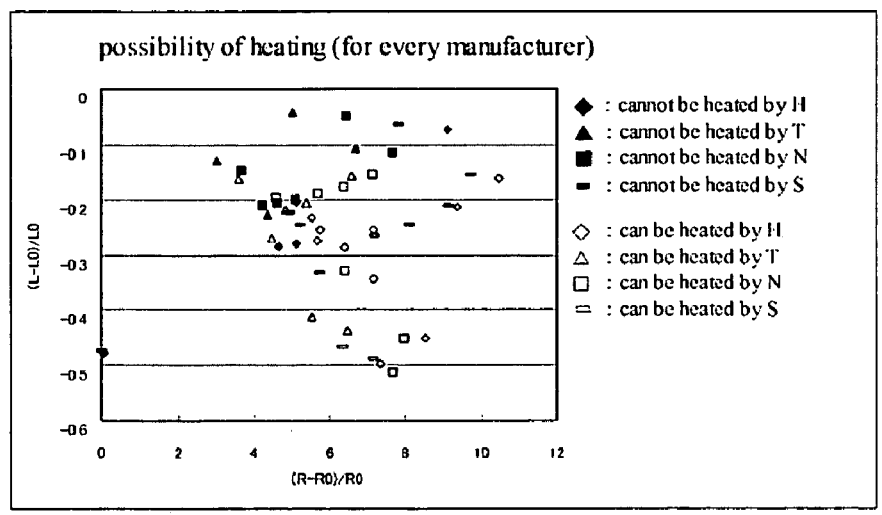
FIG. 2 A graph showing a result of measurement of the ratio of resistance change with respect to the impedance check frequency of a conductive material and a ratio of inductance change with respect to the impedance check frequency of the conductive material.
Figure 3:
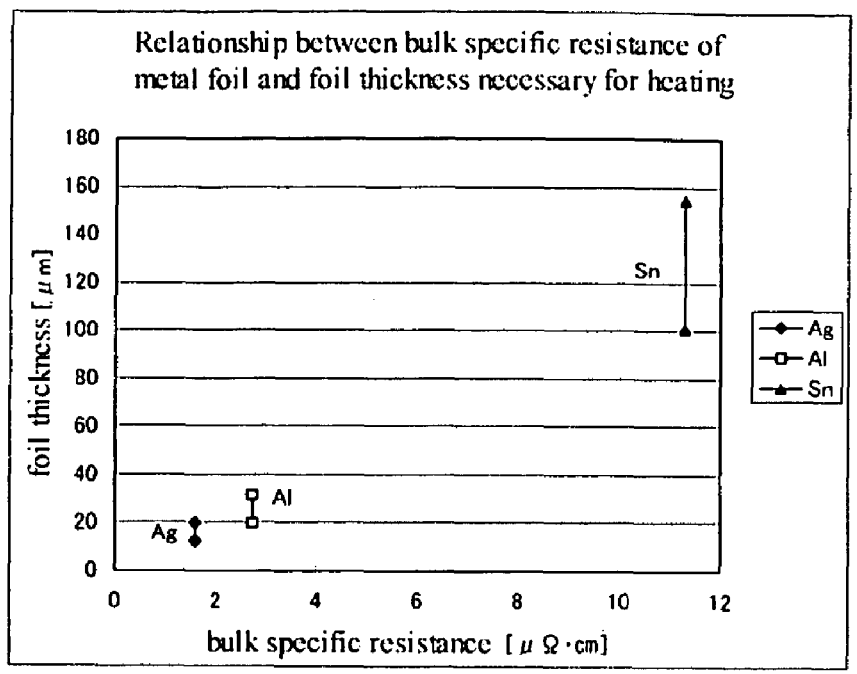
FIG. 3 A graph showing the relationship between the bulk specific resistance of a metal foil material and a foil thickness necessary for heating.
Figure 4:
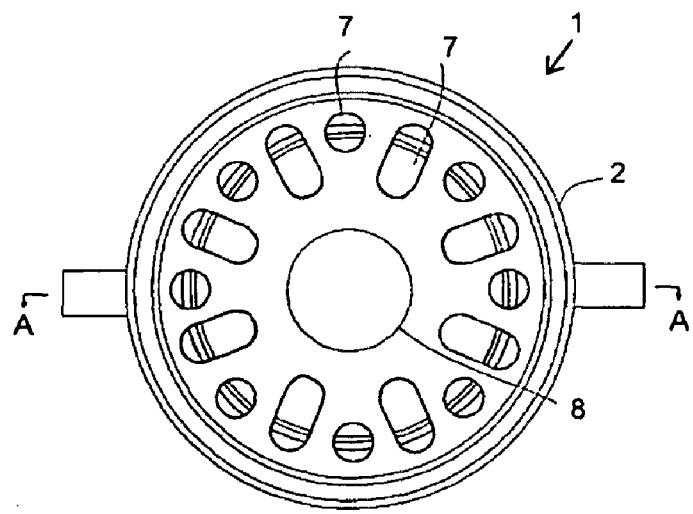
FIG. 4 A plan view showing an embodiment 1 of a container for an electromagnetic cooker according to the present invention.
Figure 5:
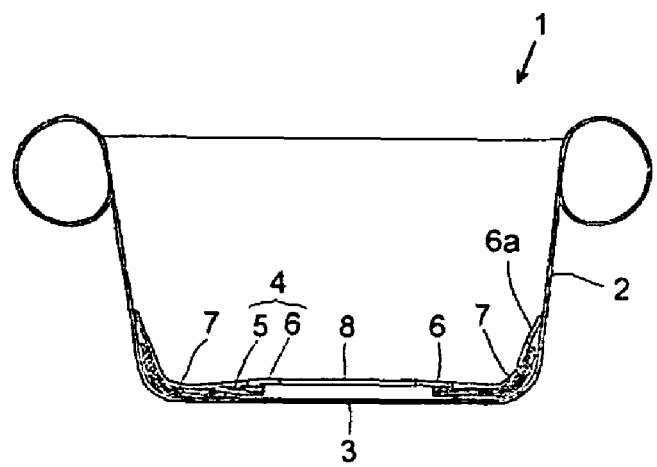
FIG. 5 A cross-sectional view taken along a line A-A in FIG. 4.
Figure 6:
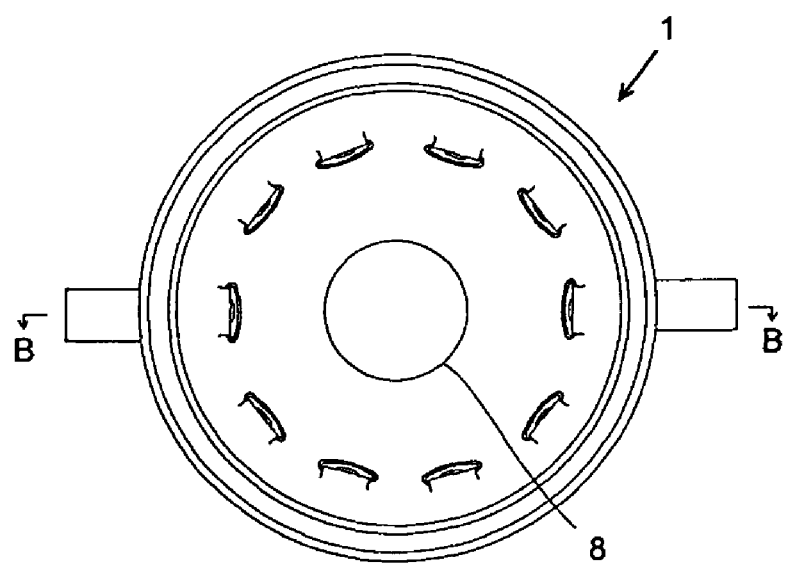
FIG. 6 A plan view showing an embodiment 2 of a container for an electromagnetic cooker according to the present invention.
Figure 7:
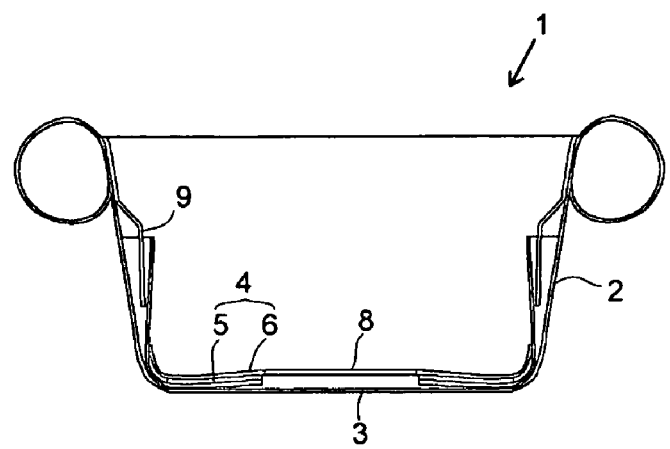
FIG. 7 A cross-sectional view taken along a line B-B in FIG. 6.
Figure 8:
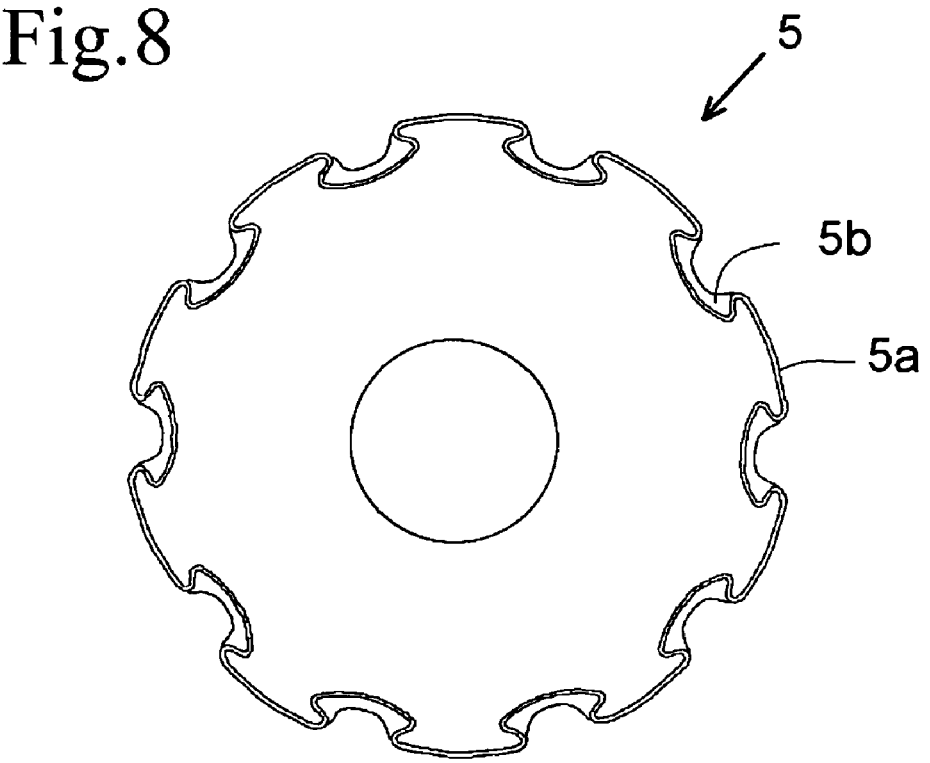
FIG. 8 A plan view of an inner cup in the embodiment 2 of the container for the electromagnetic cooker according to the present invention.
Figure 9:
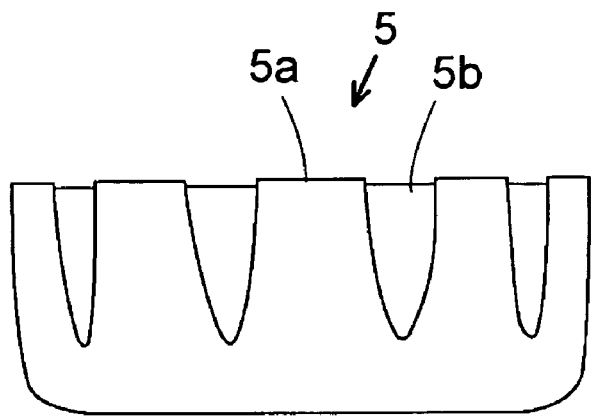
FIG. 9 A front view of the inner cup in the embodiment 2 of the container for the electromagnetic cooker according to the present invention.
Figure 10:
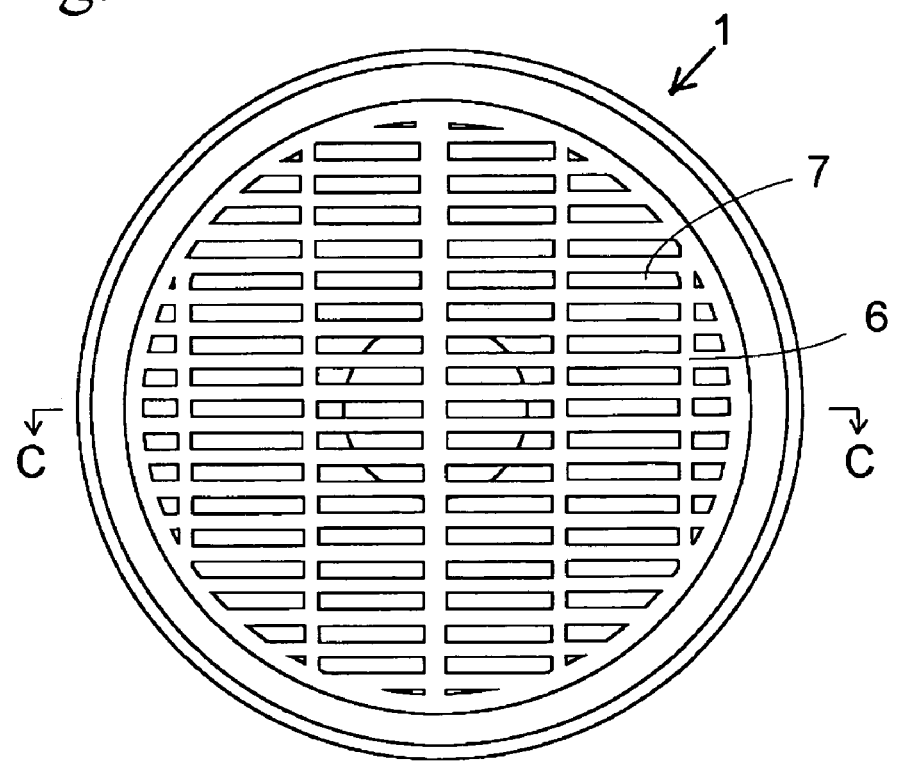
FIG. 10 A plan view of an embodiment 3 of a container for an electromagnetic cooker according to the present invention.
Figure 11:
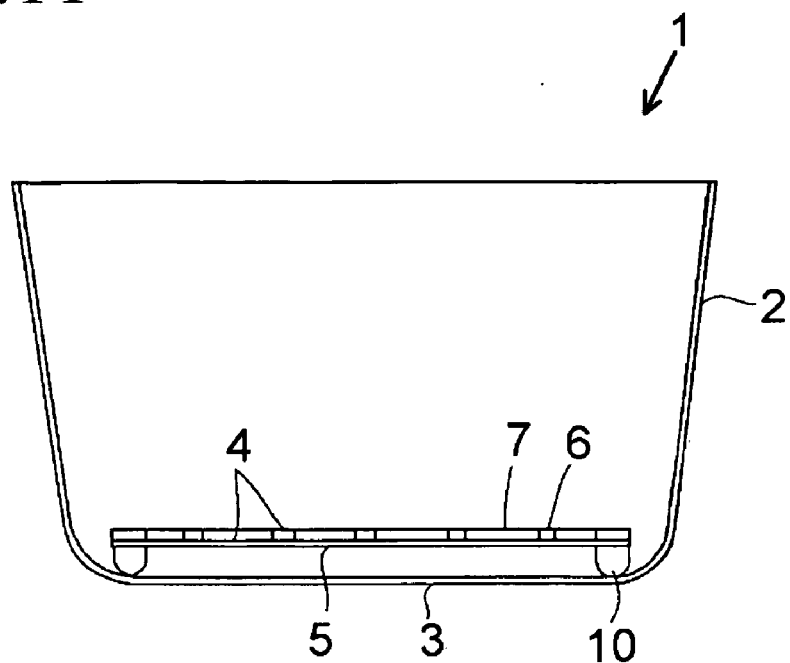
FIG. 11 A cross-sectional view taken along a line C-C in FIG. 10.
Figure 12:
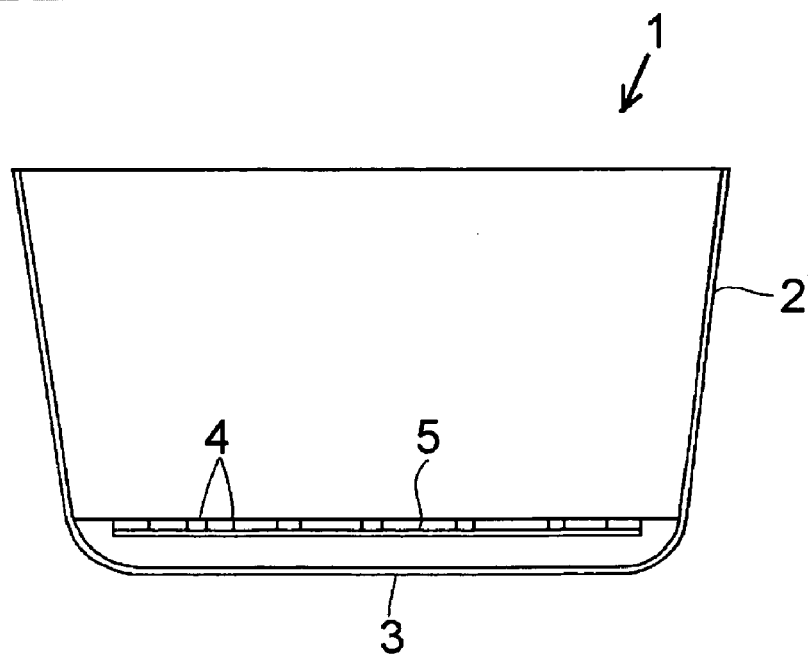
FIG. 12 A cross-sectional view showing another embodiment of the embodiment 3 of the container for the electromagnetic cooker according to the present invention.

| | |
|---|---|
| 1: | container for electromagnetic cooker |
| 2: | side wall |
| 3: | bottom portion |
| 4: | conductive layer |
| 5: | conductive material |
| 6: | non-conductive material |
| 7: | content liquid convection hole |

The invention claimed is:

1. A container for an electromagnetic cooker including a conductive layer at least in a bottom portion of the container made of a non-conductive material, wherein the ratio of resistance change $(R-R_0)/R_0$ of the conductive layer with respect to the impedance check frequency of a heating coil is set to 5.3 or more, and the ratio of inductance change $(L-L_0)/L_0$ of the conductive layer with respect to the impedance check frequency of the heating coil is set to −0.17 or less, wherein R indicates the high-frequency resistance on a heating coil side with a load, R0 indicates the high-frequency resistance on the heating coil side without a load, L indicates the inductance on the heating coil side with a load, and L0 indicates the inductance on the heating coil side without a load.

2. A container for an electromagnetic cooker according to claim 1, wherein the conductive layer is formed of metal foil.

3. A container for an electromagnetic cooker according to claim 1, wherein the conductive layer is formed of a coating material containing metal powder.

4. A container for an electromagnetic cooker according to claim 1, wherein the conductive layer is formed on an inner surface of the bottom portion of the container.

5. A container for an electromagnetic cooker according to claim 4, wherein the conductive layer is made of a laminate material constituted of a conductive material and a non-conductive material, and the conductive material is disposed on a bottom-portion side of the container.

6. A container for an electromagnetic cooker according to claim 5, wherein the non-conductive material of the conductive layer is curved upwardly along a side wall of the container, and is adhered to a lower portion of an inner surface of the side wall of the container.

7. A container for an electromagnetic cooker according to claim 5, wherein a content liquid convection hole is formed in the non-conductive material of the laminate material.

8. A container for an electromagnetic cooker according to claim 1, wherein the conductive layer is formed into a doughnut shape.

9. A container for an electromagnetic cooker according to claim 5, wherein the conductive material of the conductive layer is formed into an uneven shape for increasing a surface area of the conductive material.

10. A container for an electromagnetic cooker according to claim 7, wherein the conductive layer is configured to be vertically movable.

11. A container for an electromagnetic cooker according to claim 5, wherein the conductive material is formed by lamination.

12. A container for an electromagnetic cooker according to claim 11, wherein the conductive material is formed by lamination while preventing end portions of the conductive material from overlapping with each other.

* * * * *